Aug. 16, 1932.  W. H. CARRIER  1,871,661
SEALING AND THRUST DEVICE
Filed March 22, 1929  2 Sheets-Sheet 1

INVENTOR.
Willis H. Carrier
By Parker & Crochron
ATTORNEYS.

Aug. 16, 1932.  W. H. CARRIER  1,871,661
SEALING AND THRUST DEVICE
Filed March 22, 1929   2 Sheets-Sheet 2

INVENTOR.
Willis H. Carrier
By Parker & Trochures
ATTORNEYS.

Patented Aug. 16, 1932

1,871,661

UNITED STATES PATENT OFFICE

WILLIS H. CARRIER, OF ESSEX FELLS, NEW JERSEY, ASSIGNOR TO CARRIER ENGINEERING CORPORATION, OF NEWARK, NEW JERSEY

SEALING AND THRUST DEVICE

Application filed March 22, 1929. Serial No. 349,251.

This invention relates to sealing and thrust devices and more particularly to sealing means for the opening through which the driving shaft or element of centrifugal vacuum pumps and compressors extends out of the compressor casing, which means provide a substantially frictionless fluid seal for the opening when the compressor is running and a mechanical closure for the opening when the compressor is not running, and which also include a device for resisting the end thrust on the shaft or driving element.

One object of the invention is to provide a sealing device of this nature which is practical and efficient in use, but which is nevertheless of very simple and inexpensive construction, and is thus desirable for small compressors to reduce the cost of construction of the same.

Other objects of the invention are to provide a simple and inexpensive combined sealing and thrust device of the sort mentioned, and also to improve sealing and thrust devices for centrifugal compressors and the like which are improved in the other respects hereinafter described and set forth in the claims.

Figure 2:
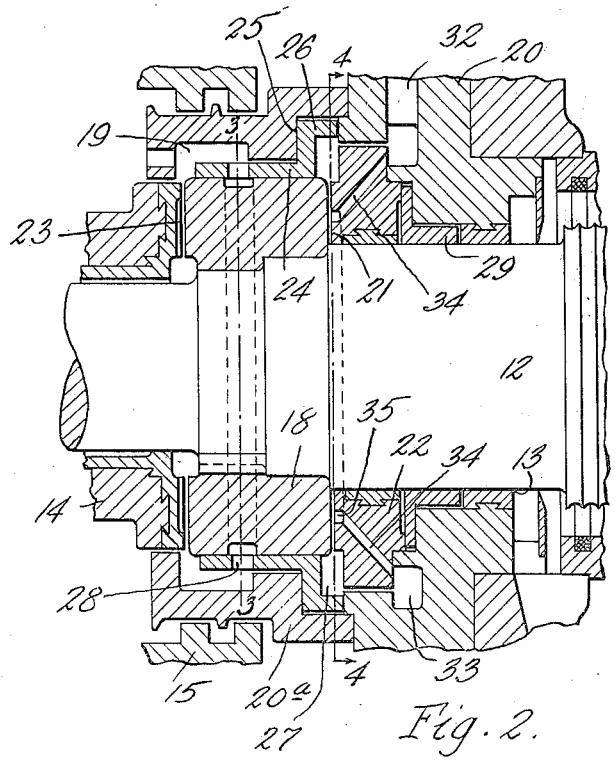
Fig. 2 is a sectional elevation showing some of the parts of Fig. 1 on a larger scale.
Figure 3:
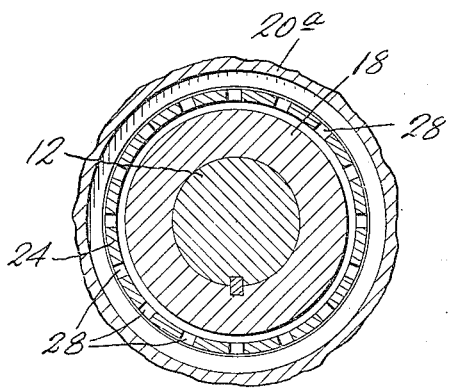
Figure 4:
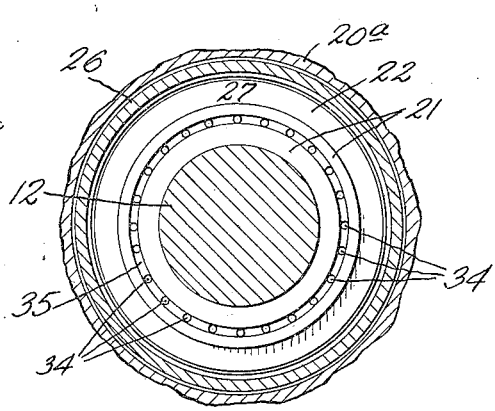

Figs. 3 and 4 are transverse sections thereof respectively on lines 3—3 and 4—4 of Fig. 2, on a slightly reduced scale.

10 represents the suction or low pressure end of the casing of a centrifugal fluid compressor, 11 one of the rotors thereof and 12 a drive shaft or element which extends out of the compressor casing through a shaft opening 13 for connection to the driving motor or device. The sealing device is for the purpose of sealing or preventing leakage of air or gas into or out of the compressor through this shaft opening.

14 represents a bearing for the shaft 12 located outwardly beyond the shaft opening 13 and enclosed within a bearing casing or housing 15 which provides a lubricating chamber 16 within which the bearing is located. The bearing, which may be of suitable construction, is preferably mounted in the housing 15 so as to have a limited rocking or tilting movement sufficient to make it self-alining. For instance, the bearing 14 is provided with a segmental, spherical surface 17 seated and adapted to rock in a complementary, segmental, spherical surface within the bearing housing.

Figure 1:
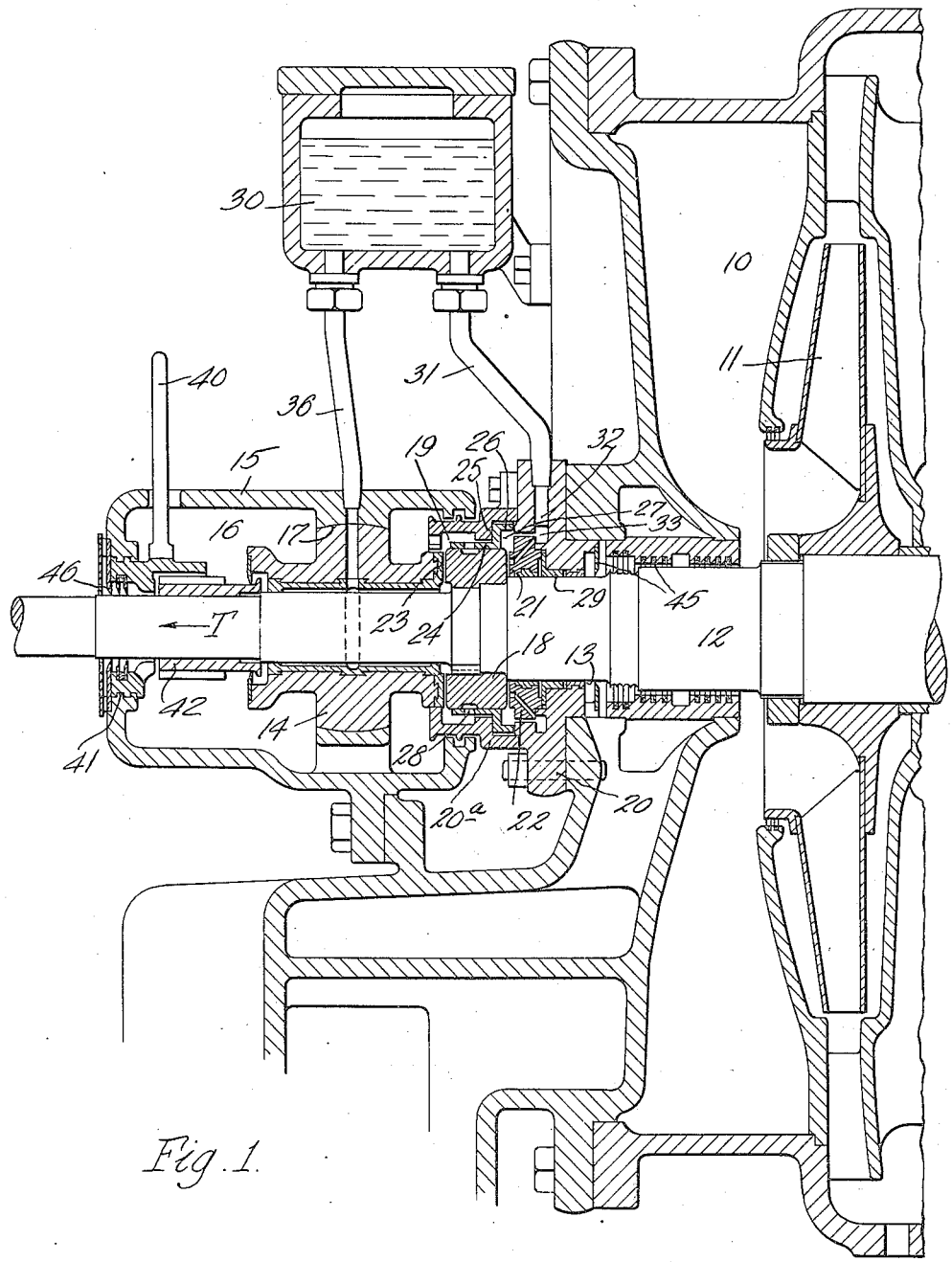
Fig. 1 is a longitudinal, sectional elevation of a sealing and thrust device embodying my invention, applied to a compressor.

18 indicates a sealing ring, collar or member which surrounds the shaft 12 between the inner end of the bearing 14 and the outer end of the shaft opening 13 in the compressor casing 10, and which may be rigidly keyed or secured to the shaft so as to rotate with the shaft and partake in any axial movement of the shaft. This ring is arranged to rotate within a sealing chamber 19 in a seal casing, which as shown, is formed by an annular end piece or part 20 which is bolted or otherwise rigidly secured to the end of the compressor casing so as to form a gas-tight joint therewith, and an annular body part 20a which is bolted or otherwise rigidly secured to the end part 20 so as to form a gas-tight joint therewith. The sealing chamber is provided at its inner end with a seat 21 opposite the inner end of the sealing ring 18 and against which the latter is adapted to seat to form a tight closure for the shaft opening when the compressor is not running. This seat 21 is preferably formed by the outer end face of a separate seat ring 22 which is stationarily secured in the end part 20 of the seal casing. The sealing ring 18 is adapted to have a limited endwise movement with the shaft 12 between the inner end 23 of the bearing 14 and the seat 21. The thrust on the shaft when the compressor is running is in the direction indicated by the arrow T in Fig. 1, that is toward the left in Fig. 1, and is taken by the inner end of the bearing 14 against which the adjacent end of the sealing ring 18 is adapted to bear. The ring 18 is thus adapted to cooperate with the seat 21 to form a seal and also to cooperate with the end of the bearing to resist thrust, the single ring or member 18 therefore functioning as a combined sealing and thrust member.

Surrounding the sealing ring 18 within the sealing chamber is a sleeve 24 which has a close running fit with the sealing ring 18, but is held from turning in the sealing chamber 19. A sealing fluid, preferably lubricating oil is supplied under pressure, as hereinafter explained, to the inner end of the sealing chamber 19, and the sleeve 24 restricts the escape of the sealing fluid between the outer periphery of the sealing ring 18 and the surrounding walls of the sealing chamber. Preferably, the sleeve 24 is of the form shown, having an enlarged inner end providing a shoulder which is adapted to contact with an opposing annular shoulder or face 25 on the body 20a of the seal casing, and the sleeve 24 is also provided at the outer periphery of its enlarged end with an annular flange 26 which projects toward the inner end of the seal casing beyond the outer periphery of the seat ring 22. The pressure of the liquid on the large inner end of the sleeve forces the shoulder of the sleeve against the shoulder 25 of the casing, which tends to prevent rotation of the sleeve. In addition, the large end of the sleeve may be held between the members 20 and 20a of the seal casing, to further insure against the rotation of the sleeve. Nevertheless, the sleeve is adapted to shift radially in the casing 20—20a sufficiently to accommodate slight eccentric rotation of the shaft. Therefore, the sleeve can have a close running fit on the sealing ring, which, together with the pressure of the large end of the sleeve against the shoulder 25 permits only a very restricted escape of the sealing liquid around the sealing ring 18. The flanged formation at the inner end of the sleeve 24 also forms an annular sealing space 27 around and communicating with the joint or space between the sealing ring 18 and the opposing seat 21. Holes 28 are preferably provided in the outer end portion of the sleeve connecting opposite annular grooves in the sealing ring 18 and the casing body 20a to allow free escape of any liquid leaking between the periphery of the sealing ring and the sleeve 24, through the holes 28 into the surrounding groove, from which the liquid can escape through the outer end of the casing body 20a into the large bearing chamber.

A packing or restricting ring 29 also preferably surrounds the compressor shaft 12 within the end part 20 of the sealing casing. This ring preferably has a close running fit with the shaft and is preferably provided with an outwardly projecting flange which is held between the seat ring 22 and an opposing shoulder on the part 20. By reason of this construction, the packing ring 29 may have a close running fit with the compressor shaft and be held from rotation, while nevertheless permitting slight radial shifting of the packing ring 28 within the seal casing to accommodate misalinement or eccentric running of the shaft.

The sealing liquid or lubricating oil may be supplied under a pressure above atmospheric pressure to the inner end of the sealing chamber 27 through suitable supply connections, such for example, as a supply reservoir 30, in which a suitable pressure is maintained, connected by a pipe 31 and a passage 32 in the sealing casing with an annular passage 33 in the sealing casing at the inner end of the seat ring 22. A plurality of ports 34 extending through the seat ring connect the passage 33 with an annular groove 35 in the face of the seat 21. The oil is maintained under pressure in the reservoir 31 when the compressor is running, in any suitable way.

During the operation of the compressor, the thrust on the compressor shaft 22 holds the sealing ring out of contact with the seat 21, and during this time the oil will be supplied under pressure through the connections described to the narrow space between the sealing ring 18 and the seat 21, thus maintaining in this space and in the surrounding annular sealing space 27 an annular body of oil which forms an effective and substantially frictionless seal around the shaft that prevents leakage of air or gas past the same into or out of the compressor casing through the shaft opening 13. The movement of the shaft and sealing ring 18 to the left under the thrust on the shaft is limited by the pressure of the ring 18 against the inner end 23 of the bearing 14 which thus takes the thrust on the shaft.

The opposing thrust faces formed by the inner end 23 of the bearing and the outer end of the sealing ring 18 are lubricated by oil which is forced to the bearing 14 through a suitable supply connection 36 and passes along the shaft through the bearing to and between said opposing thrust faces of the bearing and the thrust and sealing ring. The thrust end 23 of the bearing is preferably faced with suitable Babbitt or anti-friction metal.

When the compressor is not running, the sealing ring 18 may be forced and held against its seat 21 by suitable means to prevent leakage through the shaft opening. Hand operated means are shown for this purpose consisting of a lever 40, the hub of which surrounds the shaft 12 and has a cam or screw engagement 41 with the outer end portion of the bearing housing 15. By turning this lever, the inner end of its hub is adapted to engage the adjacent end of a sleeve 42 fixed on the shaft and force the shaft inwardly until the sealing ring is pressed tightly against the seat 21. When the sealing ring is seated against the seat 21, the ring of oil maintained in the groove 35 in the face of the seat assists in insuring a gas-tight closure around the shaft opening.

Labyrinth or other suitable packings 45 and 46 may be provided for reducing the leakage through the shaft opening 13 and the shaft opening in the outer end of the bearing housing 15.

I claim as my invention:

1. The combination with a rotary shaft and a casing having a shaft opening through which said shaft extends, of a sealing member surrounding said shaft, a rotation bearing for said shaft at one end of said sealing member, a seat opposing the opposite end of said sealing member, one end of said sealing member cooperating with the adjacent end of said bearing to oppose the thrust on said shaft, means for moving said sealing member against said seat to form a closure for said shaft opening, and means for supplying lubricant between the adjacent ends of said bearing and said sealing member.

2. The combination with a rotary shaft and a casing having a shaft opening through which said shaft extends, of a sealing member surrounding and rigid with said shaft, a rotation bearing for said shaft at one end of said sealing member, a seat opposing the opposite end of said sealing member, one end of said sealing member cooperating with the adjacent end of said bearing to oppose the thrust on said shaft, means for moving said sealing member against said seat to form a closure for said shaft opening, and means for forcing lubricant through said bearing to and between the adjacent ends of said bearing and said sealing member.

3. The combination with a rotary shaft and a casing having a shaft opening through which said shaft extends, of a sealing member surrounding said shaft, a rotation bearing for said shaft at one end of said sealing member, a seat opposing the opposite end of said sealing member, one end of said sealing member cooperating with the adjacent end of said bearing to oppose the thrust on said shaft, means for moving said sealing member against said seat to form a closure for said shaft opening, means for supplying lubricant between the adjacent ends of said bearing and said sealing member, and means for maintaining a liquid seal between said sealing member and said seat.

4. The combination with a rotary shaft and a casing having a shaft opening through which said shaft extends, of a sealing member surrounding and rigid with said shaft, a sealing chamber in which said sealing member moves, a rotation bearing for said shaft opposite one end of said sealing member, a seat surrounding said shaft and opposing the opposite end of said sealing member, said sealing member having axial movement limited in opposite directions by said bearing and said seat, means for supplying liquid under pressure to said sealing chamber to provide a liquid seal surrounding said shaft opening, and means for forcing lubricant through said bearing to and between the adjacent ends of said bearing and said sealing member.

5. The combination with a rotary shaft and a casing having a shaft opening through which said shaft extends, of means for sealing said shaft opening comprising a sealing member rotatable with said shaft, a sealing chamber in which said sealing member rotates, a seat in said sealing chamber opposing one end of said sealing member, means for supplying liquid under pressure to said sealing chamber to form a liquid seal for said shaft opening, and an annular sleeve surrounding and having a running fit on said sealing member within said sealing chamber, said sleeve being held from rotation with said sealing member but being capable of a limited radial shifting with said sealing member in said sealing chamber.

6. The combination with a rotary shaft and a casing having a shaft opening through which said shaft extends, of means for sealing said shaft opening comprising a sealing member rotatable with said shaft, a sealing chamber in which said sealing member rotates, a seat in said sealing chamber opposing one end of said sealing member, an annular sleeve surrounding said sealing member within said sealing chamber and within which said sealing member has a running fit, said sleeve being radially shiftable and having an enlarged end facing said seat, and means for supplying liquid under pressure to said sealing chamber between said seat and said enlarged end of said sleeve to form a liquid seal for said shaft opening.

7. The combination with a rotary shaft and a casing having a shaft opening through which said shaft extends, of means for sealing said shaft opening comprising a sealing member rotatable with said shaft, a sealing chamber in which said sealing member rotates, a seat in said sealing chamber opposing one end of said sealing member, an annular sleeve surrounding said member in which said sealing member rotates and which is movable radially but is held from rotation in said sealing chamber, said sleeve having an enlarged end with a peripheral flange projecting towards said seat, and means for supplying liquid under pressure to said sealing chamber between said seat and said enlarged end of said sleeve to form a liquid seal for said shaft opening.

8. The combination with a rotary shaft and a casing having a shaft opening through which said shaft extends, of means for sealing said shaft opening comprising a sealing member rotatable with said shaft, a sealing chamber in which said sealing member rotates, a seat in said sealing chamber opposing one end of said sealing member, an annular sleeve surrounding said sealing member in which said sealing member rotates and which is movable radially but is held from rotation in said sealing chamber, said sleeve having an enlarged end with a peripheral flange projecting towards said seat, means for supplying liquid under pressure to said sealing chamber between said seat and said enlarged end of said sleeve to form a liquid seal for said shaft opening, and means for pressing said sealing member against said seat to form a closure for said shaft opening when the shaft is stationary.

9. The combination with a rotary shaft and a casing having a shaft opening through which said shaft extends, of means for sealing said shaft opening comprising a sealing member rotatable with said shaft, a sealing chamber in which said sealing member rotates, a seat opposing one end of said sealing member, an annular sleeve surrounding said sealing member at one side of said seat and in which said sealing member rotates and which is movable radially but is held from rotation, and a ring which surrounds said shaft at the opposite side of said seat and in which said shaft rotates and which is movable radially but is held from rotation, and means for supplying liquid under pressure to said sealing chamber to form a liquid seal for said shaft opening.

10. The combination with a rotary shaft and a casing having a shaft opening through which said shaft extends, of means for sealing said shaft opening comprising a sealing member surrounding said shaft and arranged to rotate and move axially with the shaft, a sealing chamber in which said sealing member rotates and has a limited axial movement, a seat at one end of said sealing chamber surrounding said shaft opening opposite one end of said sealing member, a fixed member opposing the opposite end of said sealing member and cooperating therewith to resist the end thrust on said shaft, means for supplying a sealing fluid to said sealing chamber to form a seal for said shaft opening, and means for positively forcing lubricant between the opposing faces of said fixed member and said sealing member.

WILLIS H. CARRIER.